United States Patent [19]
Ronstrom

[11] Patent Number: 5,826,019
[45] Date of Patent: Oct. 20, 1998

[54] MODULAR APPLICATION SOFTWARE AND DATA PROVIDING MOBILITY IN TELECOMMUNICATION NETWORKS

[75] Inventor: Mikael Ronstrom, Hägersten, Sweden

[73] Assignee: Telefonaktiebolaget LM Ericsson, Stockholm, Sweden

[21] Appl. No.: 590,679

[22] Filed: Jan. 29, 1996

Related U.S. Application Data

[63] Continuation of Ser. No. 221,925, Apr. 1, 1994, abandoned.

[51] Int. Cl.[6] ................................................. G06F 13/00
[52] U.S. Cl. .............................. 395/200.31; 395/200.53; 707/10
[58] Field of Search ............................. 395/200.03, 600, 395/650, 700, 200.31, 200.32, 200.48, 200.53, 200.55, 200.56, 680; 379/57, 221, 222, 233

[56] References Cited

U.S. PATENT DOCUMENTS

| | | | |
|---|---|---|---|
| 4,881,166 | 11/1989 | Thompson et al. | 707/8 |
| 4,924,510 | 5/1990 | Le | 379/221 |
| 4,961,133 | 10/1990 | Talati et al. | 375/708 |
| 5,157,390 | 10/1992 | Yoshie et al. | 340/825.52 |
| 5,200,993 | 4/1993 | Wheeler et al. | 379/93.02 |
| 5,270,701 | 12/1993 | Ito et al. | 340/825.03 |
| 5,291,479 | 3/1994 | Vaziri et al. | 370/264 |
| 5,297,285 | 3/1994 | Abrahamsson et al. | 395/685 |
| 5,396,543 | 3/1995 | Beeson, Jr. et al. | 455/560 |
| 5,408,608 | 4/1995 | Ryu et al. | 707/10 |
| 5,416,917 | 5/1995 | Adair et al. | 395/500 |
| 5,418,840 | 5/1995 | Le Bastard | 455/560 |
| 5,434,852 | 7/1995 | La Porta et al. | 370/385 |
| 5,528,281 | 6/1996 | Grady et al. | 348/7 |

FOREIGN PATENT DOCUMENTS

| | | |
|---|---|---|
| 0 581 526-A2 | 2/1904 | European Pat. Off. . |
| 0 556 515 A2 | 12/1992 | European Pat. Off. . |
| 0 666 697 A2 | 1/1995 | European Pat. Off. . |
| WO-A1- | | |
| 9300776 | 7/1993 | WIPO . |

OTHER PUBLICATIONS

Tom Bowen, Gita Gopal, Gary Herman, William Mansfield, Jr., *A Scalable Database Architecture for Network Services*, May 27–Jun. 1, 1990, vol. V. pp. 45–51.

Masanobu Fujioka, Sei–ichiro Sakai, Hikaru Yagi, IEEE Network, *Hierarchical and Distributed Information Handling for UPT*, Nov. 4, 1990, No. 6, pp. 50–60.

Motoo Hoshi, Tatsuo Nohara, Hiroshi Tokunaga and Yoshiyuki Yasuada, IEICE Transactions, *Functional Reference Model for Universal Personal Telecommunication Service Studied by Considering Three Mobilities*, Nov. 1991, No. 11, pp. 3719–3725.

Kiyomi Sato, Jun–ichi Mizusawa, Naoki Shigematsu, Yoshitsugu Kondo, IEEE, *Hierarchical Network Data Management Architecture Applied to the Public Telephone Network*, 1987, pp. A12.4.1.–A12.4.5.

(List continued on next page.)

*Primary Examiner*—Parshotam S. Lall
*Assistant Examiner*—Viet Vu
*Attorney, Agent, or Firm*—Jenkens & Gilchrist, P.C.

[57] ABSTRACT

A system for managing data used by application software having a plurality of application modules executable on switching systems located throughout a heterogeneous telecommunications network. Portions of data are stored in data managers at a plurality of data storage locations distributed within the network independently of the application modules. Each storage location is also supported by a data manager. An application module is executed to define a parameter of the data required for the execution of the application software. The data manager supporting the application module is requested to search the data managers at the data storage locations for the required data and to identify the data manager in which the required data is stored. The required data is retrieved from the identified data manager and written from the identified data manager to the application module for use during continued execution of the application software.

18 Claims, 5 Drawing Sheets

OTHER PUBLICATIONS

Koso Murakami, Masafumi Katoh, IEEE Journal on Selected Areas in Communications, *Control Architecture for Next–Generation Communication Networks Based on Distributed Databases*, vol. 7, No. 3, Apr. 1989, pp. 418–423. *CEC Deliverable No.: 43/RNL/FN8/RI/A/025/b1*, Issue 2.1, Nov. 12, 1989, pp. 1, 3, 5, 7.

Koso Murakami, Masafumi Katoh, *Control Architecture for Next–Generation Communication Networks Based on Distributed Databases*, IEEE Journal on Selected Areas in Communications, vol. 7, No. 3, Apr. 1989, pp. 418–423.

Mark Blakey, *Partially Informed Distributed Databases: Conceptual Framework and Knowledge Model*, Technical Report No. 80, Dec. 1986, pp. 1–35.

Mark Blakey, *Partially Informed Distributed Databases: Conceptual Framework and Knowledge Model*, Technical Report No. 87/85, May 1987, pp. 1–72.

Mark Blakey, *Partially Informed Distributed Databases: Update Distribution Algorithm*, Technical Report No. 87/100, Dec. 1987, pp. 1–50.

MODULAR APPLICATION SOFTWARE AND DATA PROVIDING MOBILITY IN TELECOMMUNICATION NETWORKS

This application is a continuation of application Ser. No. 221,925 filed on Apr. 1, 1994 which was abandoned upon the filing hereof.

FIELD OF THE INVENTION

This invention relates to a telecommunications network and, more particularly, managing data within a heterogeneous telecommunications network.

BACKGROUND OF THE INVENTION

Over the past several years, new telecommunications networking concepts have been developed beyond the traditional public switched telecommunications networks ("PSTN") including, without limitation, integrated services digital networks ("ISDN"), cellular networks, intelligent networks ("IN") and business communication networks ("BCOM") collectively referred to as "service networks". The combination of these service networks forms a heterogeneous telecommunications network such as the one shown in FIG. 1 wherein the individual networks, which are the shaded areas, comprise a plurality of exchanges shown therein.

Figure 1:
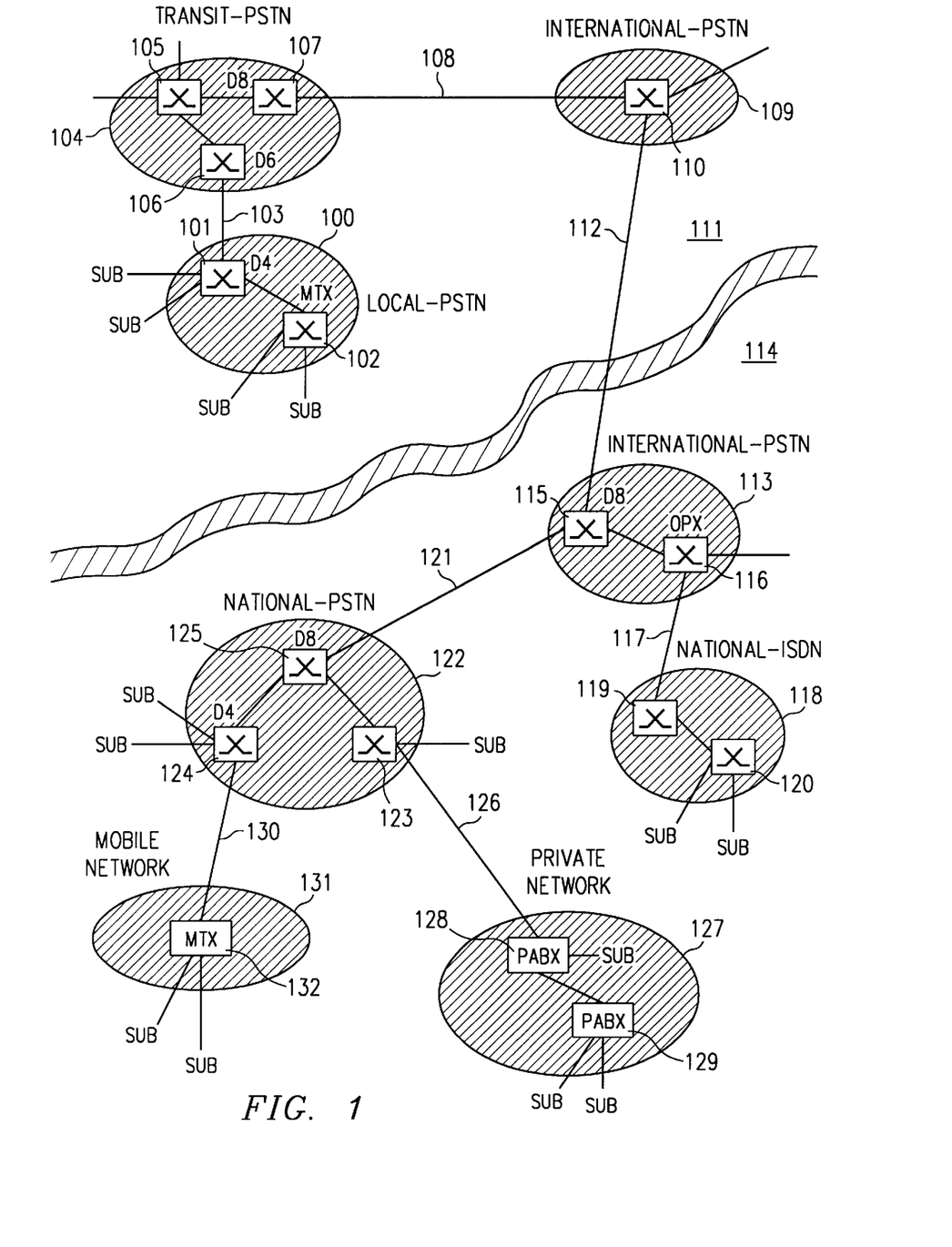
FIG. 1 is a schematic illustration of a heterogeneous telecommunications network including different types of service networks in which the present invention can be practiced.

Referring in more detail to FIG. 1, a local PSTN 100 comprises two telephone exchanges, a D4 exchange 101 servicing a mobile telephone exchange ("MTX") 102, each serving local subscribers ("SUB"). The local PSTN 101 is connected by the D4 exchange 101 via trunks 103 to a transit PSTN 104 comprising three telephone exchanges, exchange 105 and a D6 and D8 exchange 106, 107 respectively, for linking subscribers to other local exchanges. The transit PSTN 104 is connected by the D8 exchange 107 via trunks 108 to an international PSTN 109 comprising an exchange 110. For purposes of illustration, these networks 100, 104, and 109 are located in a first country 111.

The international PSTN 109 links the first country 111 via trunks 112 to another international PSTN 113 in a second country 114. The international PSTN 113 comprises a D8 exchange 115 connected to the trunks 112 and an OPX exchange 116. The OPX exchange 116 is connected via trunks 117 to a national ISDN 118 comprising two exchanges 119 and 120, the former being connected to the trunks 117, each one of which serves a plurality of subscribers. The D8 exchange 115 is also connected via trunks 121 to a national PSTN 122 comprising three exchanges servicing subscribers, including exchange 123 and a D4 and D8 exchange 124, 125 respectively, the D8 exchange being connected to the trunks 121. The exchange 123 connected to the D8 exchange 125 services subscribers and is also connected via trunks 126 to a private network 127 comprising two private automatic branch exchanges ("PABX") 128, 129. The PABX 128 is connected directly to the trunks 126 and serve subscribers as well as the PABX 129. The D4 exchange 124 connected to the D8 exchange 125 serves subscribers and is connected via trunks 130 to a cellular or mobile network 131 comprising a mobile telephone exchange ("MTX") 132 serving a group of subscribers. All of the exchanges connecting different service networks communicate with one another by means of network protocol converters, i.e., gateways, which facilitate communications between the respective subscribers and other subscribers within the network.

All of the exchanges are stored program control ("SPC") switching systems which are high-speed computing machines including redundant central processors ("CP") for reliability and remote processors for increased speed and efficiency. A good example of such a switch is the SPC telecommunications switching equipment of the type manufactured by Telefonaktiebolaget L.M. Ericsson and referred to as the AXE exchange, an earlier version of which is disclosed in the article by Mats Eklund, et al., entitled "AXE 10 System Description", published in *Ericsson Review*, No. 2, 1976, which is hereby incorporated herein by reference. The AXE consists of two main parts: switching equipment (the "APT") and a computer for controlling the switching equipment (the "APZ"). Another example of such an SPC telecommunications switch is disclosed in U.S. Pat. No. 4,322,843 to H.J. Beuscher, et al. Such switches usually include all of the hardware necessary to perform a number of different telecommunications services. They can be used as local PSTN exchanges, long distance trunking exchanges, PABXs and MTXS, all primarily by the installation of specific SPC software to configure them for the required special functions. For example, the MTX 113 comprises a mobile switching center ("MSC") for controlling the interconnection of various radio base site controllers ("BSC") and allowing mobile subscribers to be passed from cell to cell within the radio network. The MSC includes the AXE and a mobile telephony subsystem ("MTS") interfacing the AXE with the BSCs. Thus, the AXE is configured to operate as a mobile switching center.

The problem with communication in such a heterogeneous telecommunications network is really threefold. First, a subscriber is limited to using specific terminal equipment at a particular network access point, i.e., no subscriber mobility. Second, a terminal used by a subscriber is limited to use at one access point in a network, i.e., no terminal mobility. Third, a subscriber is limited to using services requiring specific terminal equipment at a particular network access point.

SUMMARY OF THE INVENTION

To solve these problems, it is necessary to develop a common networking concept embodied in a common network architecture that describes how to distribute data and logic. According to the instant invention, a method is provided for managing data used by application software having a plurality of application modules executable on switching systems located throughout a heterogeneous telecommunications network. The method comprises storing the data at a plurality of data storage locations each having a data manager associated therewith, and distributed within the telecommunications network independently of the application software. A first application module is then executed to define a parameter of the data required during execution of the application software. As a result, a first data manager is requested to search the data storage locations for the data satisfying the parameter and retrieve the data therefrom. The retrieved data is then written from the first data manager to the first application module for use during continued execution of the application software.

Consequently a system is provided in this invention for managing data used by application software in a telephone switching system in which the application modules and the software which executes the system are distributed throughout the telecommunication network system. The data is stored using data managers in locations which may be different from the location of the application software itself and a "client server" type of use of this data is employed by the system.

It is an object of the invention to provide personal mobility in a heterogeneous telecommunications network wherein a subscriber is able to make and receive calls based on his identity only, independent of the terminal and the network access point. The subscriber can also receive services from one or more providers of services. It is yet another object of the invention to provide terminal mobility wherein the terminal can access a heterogeneous telecommunications network at any number of access points because the terminal and network are able to automatically identify each other. It is still another object of the invention to provide service mobility wherein a subscriber is able to use all his services at any access point in the heterogeneous telecommunications network.

BRIEF DESCRIPTION OF THE DRAWINGS

For a more detailed understanding of the present invention and for further objects and advantages thereof, reference can now be made to the following description taken in conjunction with the accompanying drawings in which.

DETAILED DESCRIPTION OF THE INVENTION

The telecommunications network of FIG. 1 as described above comprises a number of different exchanges which can be viewed as nodes in the heterogeneous network, each one being part of a different service network. The software structure of the applications executed on the hardware of each SPC exchange would be, for example, a unique combination of individual application modules ("AM") for performing certain tasks or providing special functionality. In the common network architecture, the AM is used to distribute the logic. Thus, when a particular task needs to be accomplished or a special functionality is required, the appropriate AM is addressed and executed.

Figure 2:
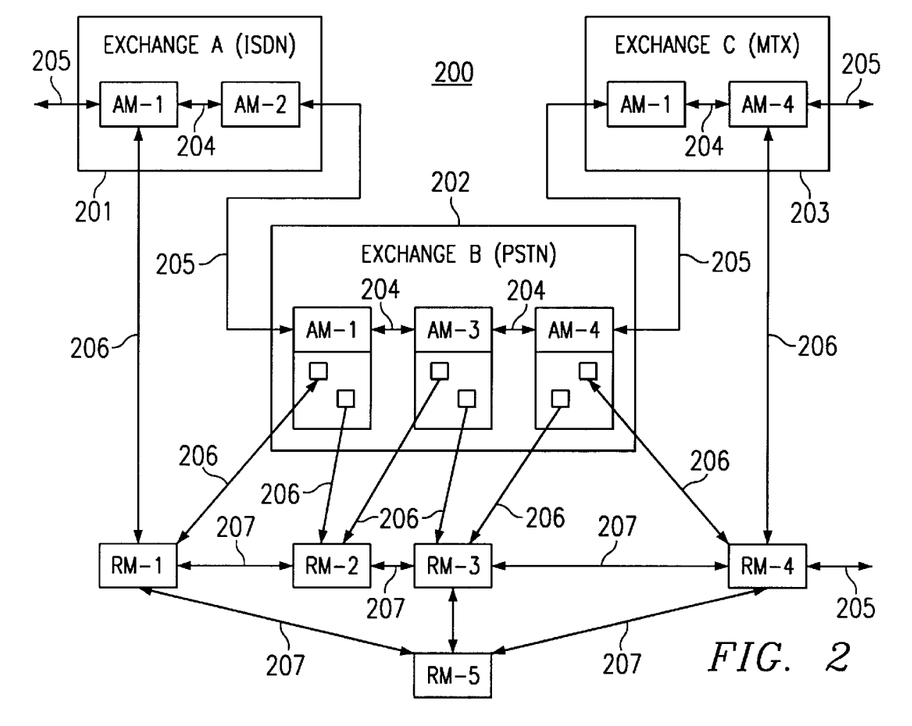
FIG. 2 is a schematic illustration of another heterogeneous telecommunications network comprising different types of exchanges having application modules supported by resource modules.

Referring to FIG. 2, a schematic illustration of another smaller heterogeneous telecommunications network 200 is shown. The network 200 comprises three different types of exchanges: exchanges A, B and C, 201–202, which can be, for example, an ISDN exchange, a PSTN exchange, and a MTX exchange, respectively, similar to the exchanges in the service networks in FIG. 1, e.g., the ISDN 118, the PSTN 122 and the mobile network 131. The software structure for each exchange is unique in function having application software comprising a different collection of applications modules. For example, the exchanges 201–203 comprise the following application modules without limitation:

| | |
|---|---|
| Exchange A (ISDN) 201 | AM-1 and AM-2 |
| Exchange B (PSTN) 202 | AM-1, AM-3 and AM-4 |
| Exchange C (MTX) 203 | AM-1 and AM-4 |

In this example, the application module AM-1 is the only one common to more than one exchange. The application modules in each exchange communicate with each other through internal AM/AM protocols 204 and within the network through external AM/AM protocols 205, as described in more detail in U.S. Ser. No. 07/723,166 filed on Jun. 28, 1991 on behalf of the inventor Sune Ramström, et al. (the "Ramström application") and assigned to Telefonaktiebolaget L.M. Ericsson, which is hereby incorporated by reference.

Each application module is supported by tools, or resource modules ("RM"), which the application module specifically selects and utilizes to help perform tasks or provide special functionality. The resource modules provide a platform to support the design of each application module. For example, the application module AM-3 is supported by a platform comprising resource modules RM-2 and RM-3, and application module AM-4 is supported by a platform comprising resource modules RM-3 and RM-4. The application modules communicate with the resource modules, and the resource modules with each other, by means of defined protocols 206 and 207, respectively. The AM/RM protocol 206 for communicating between the application module and the resource module is structured in the form of a system interface, i.e., both elements of the communication are contained within the same environment or within a common control system. The AM/AM protocols 204 are peer-to-peer communication, while AM/RM protocols 206 are client to server oriented. The user interface to a resource module may consist of PLEX signals or other software messages, and the interface is described in an interface specification. A resource module has an identical interface to all application and resource modules, thereby preventing a resource module from sending any unique signals. In order to assist an application module in the performance of a task, a resource module can call upon the services of other resource modules and communicate according to defined RM/RM protocols 207. This architecture is also more fully disclosed in the Ramström patent application.

Each resource module has a limited, defined function which enables the same resource module to be used by a wide variety of application modules. For example, resource module RM-2 is a Transaction Manager offering a service similar to that offered by the message transfer part ("MTP") of the external C7 signalling system, but in conformance with the internal AM/AM protocol 204 specified between application modules AM-1 and AM-2. The Transaction Manager RM-2 guarantees the safe transfer of messages without attempting to understand their meaning. Resource module RM-1 is a subscriber number ("SNB") Manager for coordinating the assignment of subscriber identification numbers. If the application module AM-1 in the PSTN exchange 202 receives a command to define a particular subscriber number, it will send a request to the SNB Manager RM-1 which will check the application module AM-1 in the ISDN exchange 201 to determine if the number is available. If it is, the SNB Manager RM-1 will assign the number to the subscriber and inform the application module AM-1 in the PSTN exchange 202 of the result. Resource module RM-4 is a Signaling Manager which supports the sending/receiving of, for example, CCITT No. 7 messages to and from other exchanges. Thus, the application module AM-4 in the PSTN exchange 202 and the MTX exchange 203 are supported by the same Signaling Manager RM-4 to communicate with other exchanges. Resource module RM-5 is a Process Manager for recording the number of application modules involved in handling a single call within one exchange. The Process Manager RM-5 assigns a unique reference number to a call being processed through the PSTN exchange 202, and records the application modules involved therein. The SNB Manager RM-1, the Transaction Manager RM-2, the Signaling Manager RM-4, and the Process Manager RM-5 are examples of resource modules which provide a unique function supporting a variety of different application modules. Other resource modules will be described below in more detail.

Figure 3:
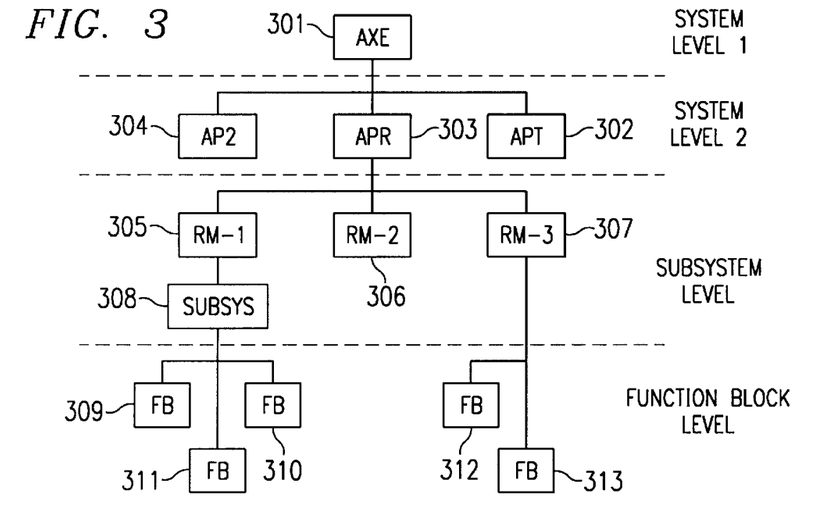
FIG. 3 is a block diagram showing an AXE exchange having application software supported by resource modules in accordance with the invention.

The AXE exchange can also be described as a combination of application modules supported by a platform of resource modules as just described. FIG. 3 is a block diagram showing an AXE exchange 301 having application software 302 supported by resource modules. The application software ("APT") 302 contains a mix of application modules, each one implementing the logical functions of the AXE exchange 301 such as, for example, the subscriber service subsystem ("SUS"), the traffic control subsystem ("TCS"), and the charging subsystem ("CHS"). The "physical" and system oriented functions of the AXE exchange 301 are implemented in the resource modules RM-1, RM-2 and RM-3 305–307 which are collectively referred to as the "APR" 303 at System Level 2. Each resource module comprises one or more subsystems which in turn consist of function blocks. For example, resource module RM-1 comprises one subsystem 308 which consists of function blocks 309, 310, 311. Resource modules may also consist of function blocks without a subsystem. For example, resource module RM-3 comprises only two function blocks 312, 313 which are not part of a subsystem. Each resource module has a limited, defined function, enabling an resource module to be used by a wide variety of application modules as part of a platform for each one.

Figure 4:
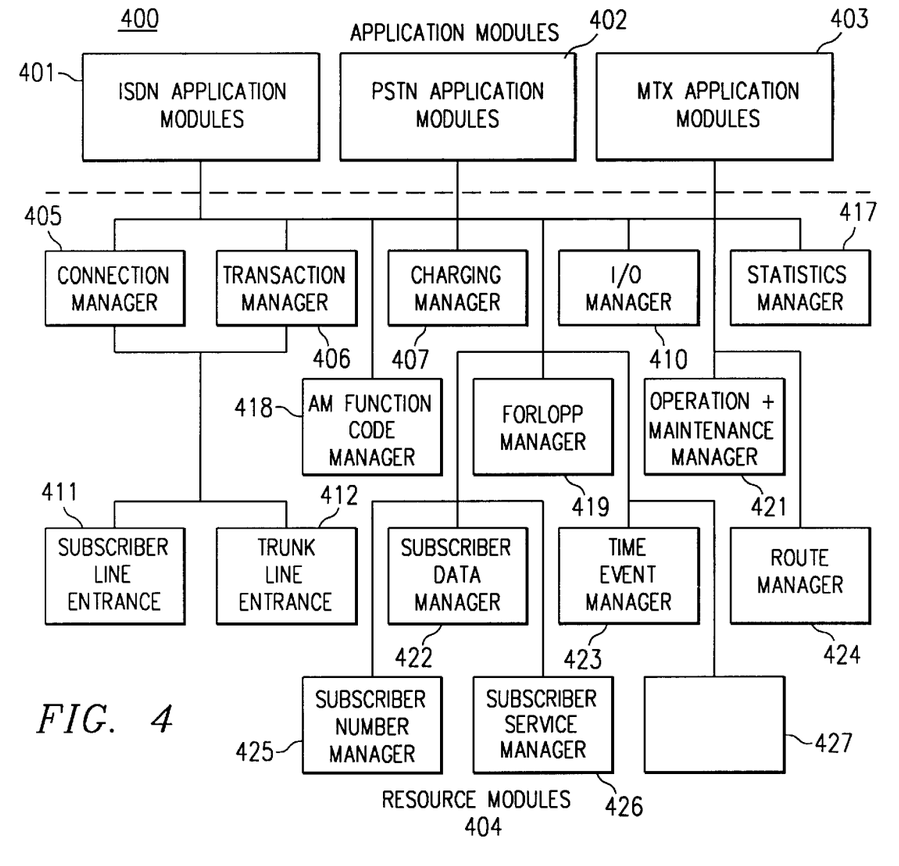
FIG. 4 is a block diagram of application modules for different exchanges supported by common resource modules in accordance with the invention.

Thus, a heterogeneous telecommunications network might comprise a plurality of separate AXE exchanges, or any other type of SPC exchange, configured to provide different network services, e.g., ISDN, PSTN or MTX, by using different application modules, each supported by a specifically identified platform of resource modules. One embodiment of such a network is shown in FIG. 4 at 400 and described more specifically in the Ramström application. The network 400 comprises ISDN AMs 401, PSTN AMs 402, and MTX AMs 403, all supported by a networked group of resource modules indicated generally at 404. For example, the Connection Manager RM 405 and Transaction Manager RM 406 form part of the resource module array by providing the essential functions of communication and connection between and with the application modules 401–403. The subscriber line entrance 411 and trunk line entrance 412 are associated with each of the Connection Manager RM 405 and Transaction Manager 406. In addition, there is shown a Charging Manager RM 407 which performs charging functions which are common to two or more of the application modules 401–403. An I/O Manager RM 410 provides input/output functions while a Statistics Manager RM 417 provides traffic recording and other statistics measurement and management functions. An AM Function Code Manager RM 418 provides function code management, while a Forlopp Manager RM 419 provides forlopp restart functions necessary within any of the application modules or within the system as a whole if necessary. An Operation and Maintenance Manager RM 421 provides the traditional operation and maintenance functions. A Subscriber Data Manager RM 422 manages data associated with individual subscribers which are common to two or more of the application modules 401–403, including a Subscriber Number Manager 425 and a Subscriber Service Manager RM 426. A Time Event Manager RM 423 provides services associated with the monitoring of certain time oriented functions within the system while a Route Manager RM 424 provides network route management functions. RM 427 represents numerous other functions, such as sending/receiving messages by employing particular types of signaling, load management, and output information management, which could be incorporated within resource modules as necessary to provide the service functions to two or more application modules.

To introduce personal, terminal and service mobility into a heterogeneous telecommunications network, it is necessary to develop a common networking concept embodied in a common network architecture that provides for the distribution of logic and data functions as described above. While application modules are used in the network to distribute logic, the resource modules are used to distribute the data. The data to be distributed includes all that is necessary to implement all three mobilities, including without limitation, data related to the user and the terminal. Thus, the user has a personal telephone number associated with individual services and special features that are recognized regardless of where he accesses the heterogeneous network. As a result, the network immediately recognizes the user when he dials the specific number or code. Such an arrangement facilitates the redirection of an entire subscriber service set based on a user instruction issued at a new location and enables, among other things, the implementation of personal telephone numbers ("PNR") for subscribers regardless of the physical location of the subscriber. An important feature of the invention is that the data distributed on the resource modules must be independent from the application modules to the extent that developers of application modules can write and revise them without knowing anything about the particular data structure. The distributed database is actually hidden from the application developer working on the exchange.

The key requirements for creating a common architecture to achieve mobility include, without limitation, the following actions. First, common call delivery, inter-working arrangements, and service calls are introduced into the network. Call delivery is that portion of the call setup during which the network access port of the called subscriber is identified. Initially, the calling party knows the identity of the called party, but the address is unknown. One example of call delivery is the interrogation of a home location function in a cellular network including a service control function to obtain the current address of the called user. Since the call delivery mechanism must support different service networks, e.g., PSTN, ISDN and cellular networks, common inter-working arrangements between providers of different service networks, and nodes within the same network, are required as well. Such arrangements are implemented by distributing service data in the network as required. Common service calls, i.e., communications between a subscriber and a service network, are also distributed in the network. Second, it is necessary to introduce the means or database required to address calls to users that may use several wireline or wireless terminals and need to be accessed over different service networks. Such means or database must handle the users identity independent of the users different subscription identities, different terminal identities and different access port addresses. Third, it is necessary to introduce a standard TMOS™ configuration ( i.e., a "telecommunications management operations support" system for the management and operation of public telecommunications networks including, without limitation, PSTN, ISDN and cellular networks, ) in order to improve support for services and network management, and to comply with the OSI, i.e., open systems interconnection, standards to be compatible with other management systems. Fourth, it is necessary to integrate wireline and wireless access in the network by providing a switching node capable of handling both. A higher degree of independence between the access point and service network portions of the system is necessary to simplify conformance to future access network standards.

There are many advantages resulting from this distribution transparency. First, application designers may store any data required without being concerned about how the data would be subsequently accessed. Second, the transparency facilitates the implementation of new database resource modules and changing the signaling protocols between them. Third, the Statistics Manager RM (417, FIG. 4) can be used to move data dynamically in the network in order to enhance performance of the service network by making it possible to have a common database developed for all system platforms. Fourth, distribution transparency facilitates the rapid loading of network nodes in minutes rather than hours or days. Fifth, distribution transparency ensures more highly reliable networks. And sixth, distribution transparency makes it possible to connect remote subscriber services ("RSS") to more than one exchange thereby increasing reliability.

To achieve these mobilities and benefit from the advantages set forth in the preceding paragraph, the resource modules in the network contain an operating system function for distributing the data. This is accomplished by a resource module data manager ("DM") shown generally at 500 in FIG. 5. The RM data manager 500 comprises a transaction manager 501, a recovery manager 502, a communication manager 503, a directory manager 504, and a local database manager 505, all of which communicate with a distributed scheduler 506. The RM data manager 500 communicates with an application module (not shown) through the distributed scheduler 506 as indicated by the bidirectional arrow 507 according to the appropriate AM/RM protocol. This RM data manager 500 could be, for example, the RM 427 shown in FIG. 4 supporting the application modules 401–403.

Figure 5:
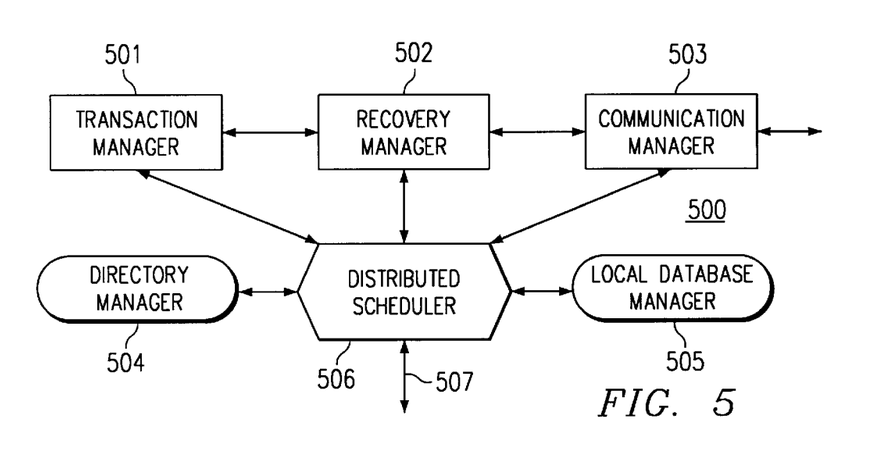
FIG. 5 is a schematic illustration of a resource module data manager ("RM data manager") for supporting application forward on different telecommunications exchanges in accordance with the invention.

When an application module initiates database retrieval and update requests through the distributed scheduler 506, the request is first sent to the local database. If the data of interest is not stored in the local database, the distributed scheduler 506 handles the request in a fashion similar to the process manager RM-5 shown in FIG. 2. The directory manager 504 contains a subset of information indicating where the relevant information can be found in the network. The transaction manager 501 controls the process of updating transactions in response to an update request from the application module. When a system crash occurs, the recovery manager 502 is responsible for ensuring that all the data is current before the data manager 500 commences processing after a restart of the system. This is accomplished by fetching data from safe storage and the other copies of data in the network if any exists. Finally, the communication manager 503 is responsible for sending and receiving messages to and from other data managers. This architecture is only one embodiment in which the invention of the present invention can be accomplished.

Figure 6:
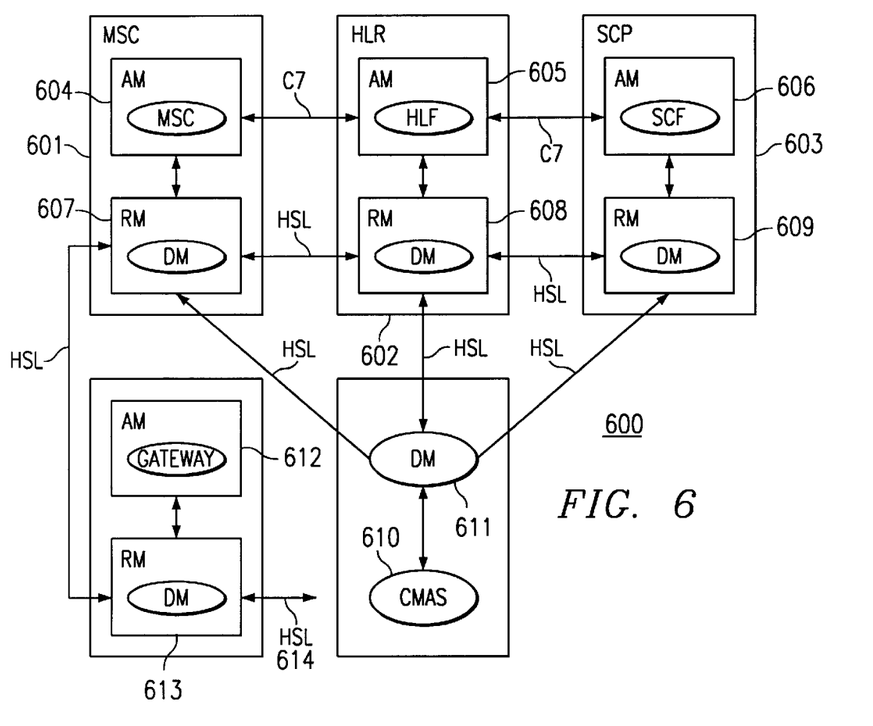
FIG. 6 is a schematic illustration of a cellular network supported by a plurality of RM data managers of the type shown in FIG. 5.

The common architecture is built so that each application module communicates with an RM Data Manager as shown in FIG. 6 which is a schematic illustration of a cellular network supported by a plurality of RM data managers similar to the RM data manager 500 described above. A portion of a cellular network is shown at 600 and comprises a mobile switching center ("MSC") 601, a home location register ("HLR") 602, and a service control point ("SCP") 603. In this illustration, the application designer distributed the logic by providing application modules 604, 605, 606 in the MSC 601, HLR 602, and the SCP 603, respectively. The designer installs the functionality wherever it is most needed in the network. The application modules 605 for the HLR 602 includes application software that provides a network function for keeping (?) subscriber's data, logic, activity and location, i.e., the home location function ("HLF") shown therein. The application module 606 for the SCP 603 includes application software that provides a network function that keeps certain subscriber data and logic in the service state. The application modules 604–606 communicate as usual via C7-signaling as indicated.

The cellular network 600 further comprises RM data managers 607, 608, 609 needed to communicate with application modules 604, 605 and 606, respectively, via AM/RM protocols shown as bi-directional arrows therebetween. The data managers are common for all application modules, and are connected in a data communication network via high-speed links ("HSL") as shown by means of communication managers similar to the communication manager 503 shown in FIG. 5. The RM Data Managers must be connected by high-speed links to maintain the performance of the distributed database. The behavior of such a distributed database is very similar to a centralized database with distributed computing. A distributed database is accessible from all locations or nodes in the network which include a RM Data Manager. Thus, if a designer includes logic in the MSC 601, the RM Data Manager 607 will handle a data retrieval and data updating even if it is a remote operation. Since the RM Data Manager 607 uses a high-speed link interface, the delay will be short even in high traffic situations. If the functions are designed into the home location register HLR 602, the database is accessed through the AM/AM protocol to order the function from the MSC 601. Thereafter, the HLR 602 uses its own RM Data Manager 608 to perform specific tasks. Correspondingly, if a designer includes logic in the service control function SCF 606, the database is accessed through the AM/AM protocol to order the function from the MSC 601. Since the application modules can all be located in one physical node, the network is dynamically configured to suit the specific traffic situation.

A cellular management application system ("CMAS") 610 uses its own RM Data Manager 611 to update data and dynamically create new copies of data for different nodes throughout the network for improved performance. The CMAS 610 uses adaptive regulation, i.e., ability to dynamically change in response to the occurrence of different conditions, to enhance network performance. A functional gateway is implemented through an application module 612 which logically needs to determine whether the data of interest belongs to the local network or another service network. The application module 612 is supported by a RM Data Manager 613 connecting the local network to the rest of the data communications network via another high speed link HSL 614. If the data does not belong to the local network, the functional gateway AM 612 will send a request to the network in which the data is stored by means of the RM Data Manager 613. The functional gateway AM 612 communicates with other databases by means of the standardized protocols.

In the common network architecture, the data is categorized as either internal data for the application module ("AM data") or global data. Internal AM data is either processed data, e.g., data specific for a call, or object data, i.e., semi-permanent data. The internal AM object data can be handled, for example, by the database subsystem ("DBS") of the AXE, and is not readable from outside of the application module. Global data is that which is accessible by an application module in any node. As indicated above, the global data must be kept independent from the AM data associated with the application modules. An example of global data is the subscriber data in an MTX.

Figure 7:
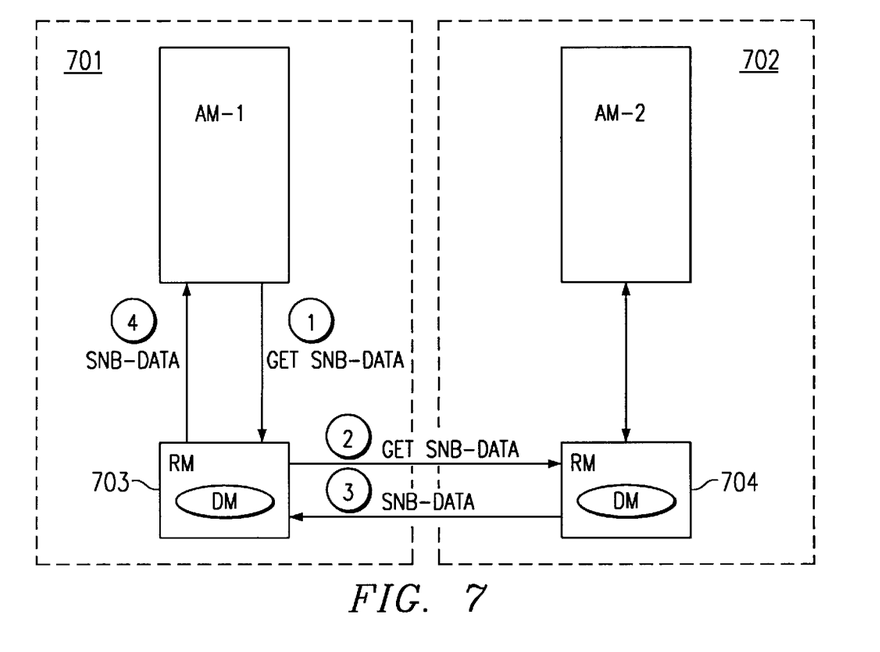
FIG. 7 is a schematic illustration of a method of communication between two RM data managers of the type shown in FIG. 5.

Referring more specifically to FIG. 7, application modules AM-1 and AM-2 in two service networks 701 and 702, respectively, are each supported by a RM Data Manager 703 and 704, respectively, similar to the RM Data Manager 500 shown in FIG. 5. These RM Data Managers 703, 704 handle global data between service networks in a manner similar to the route manager and SNB manager in an AXE network. The RM Data Manager 703 reads, writes, inserts and deletes data that is global and accessible by an application module in any node. For example, the RM Data Manager 703 stores subscriber data globally including, without limitation, the free numbering in the ISDN or PSTN networks. More specifically, when the application module AM-1 asks the RM Data Manager 703 for such global subscriber data as shown in step (1), the RM Data Manager 703 first searches its own local database. If the global subscriber data is not found internally, the RM Data Manager 703 searches other RM Data Managers throughout the telecommunications network including the RM Data Manager 704 supporting the application module AM-2 as shown in step (2). When the global subscriber data is found, for example in RM Data Manager 704, the data is sent to the RM Data Manager 703 which reports the data to the application module AM-1.

Figure 8:
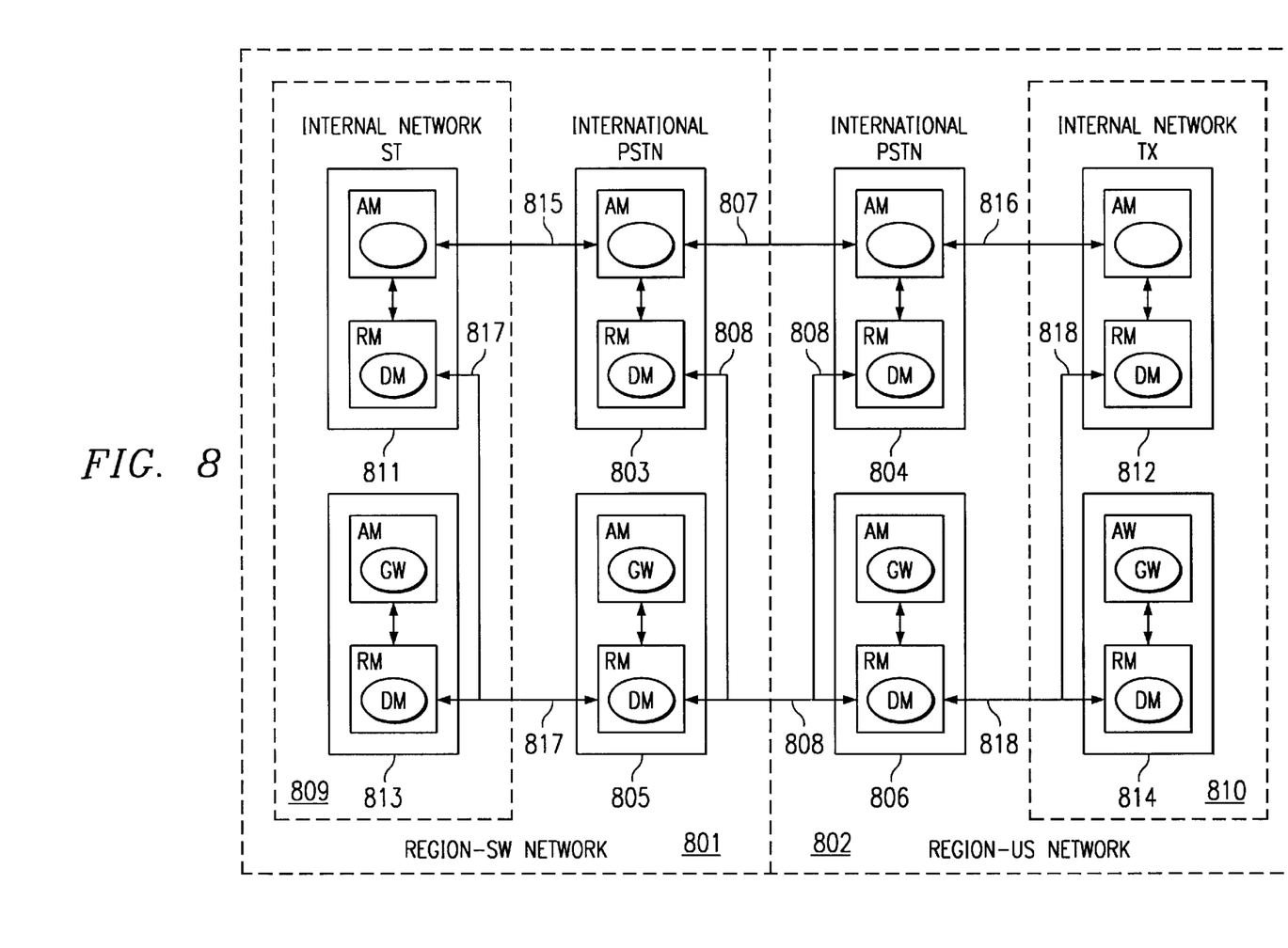
FIG. 8 is a schematic illustration of a common network architecture represented by exchanges in two regional networks having application modules supported by RM data managers in accordance with the invention.

Referring to FIG. 8, an example of a common network architecture for a network of databases distributed according to the present invention is shown. Two regional networks, Region-SW network 801 and Region-US network 802, are shown as an example of portions of a global network linked by exchanges via gateways. In this example, international PSTNs 803 and 804 comprise application modules and RM Data Managers as described above, and are supported by corresponding gateways 805 and 806 also comprising application modules and RM Data Managers. The application modules of the international PSTNs 803, 804 are connected via trunks 807, and all the RM Data Managers communicate via high speed links HSL 808.

An internal network of RM Data Managers is linked by internal gateways to other internal networks, as well as directly to an international PSTN as shown in FIG. 8, wherein an internal network ST 809 is linked to the international PSTN 805 and internal network TX 810 is linked to the international PSTN 806. Each internal network 809, 810 comprises a plurality of exchanges in different service networks as described above and represented by 811 and 812, respectively, both supported by corresponding internal gateways 813 and 814, respectively. The internal networks 811, 812 and their corresponding internal gateways 813, 814 both comprise application modules and RM Data Managers as shown. The application modules of the internal networks 811, 812 are connected via trunks 815 and 816, respectively, to the application modules of the corresponding international PSTNs 803 and 804, respectively. The RM Data Managers supporting the internal network 811 and the internal gateway 813 are connected via high speed links HSL 817 to the RM Data Manager supporting the international gateway 805. The RM Data Managers supporting the internal network 812 and the internal gateway 814 are connected via high speed links HSL 818 to the RM Data Manager supporting the international gateway 806. The high speed data links HSLs 808, 817, 818 form the global network of databases providing all three mobilities according to the instant invention. It should be understood that this example showing a database network between regions can be extended through a hierarchy of subregions through subgateways before connecting to a local service network such as the local PSTN 100, the private network 126 and the mobile network 131 shown in FIG. 1.

It should also be understood from the description above that all data categorized as global data is stored in the RM Data Managers comprising this distributed database network. A model describing precisely where the global data should be stored in this distributed database network is applied to an architecture model. It is necessary that the model enables efficient algorithms for retrieving and updating global data, but also permits the database network to grow rapidly in size, complexity, and functionality within reasonable cost tolerances. Such a model known to those skilled in the art is the partially informed distributed database ("PIDDB") which can be used in the RM Data Managers without affecting the application modules. The PIDDB model is described in more detail in a document entitled "Partially Informed Distributed Databases: Conceptual Framework and Knowledge Model", Technical Report Number 80, by Mark Blakely, dated December 1986, which is hereby incorporated by reference.

As can be seen from the above description of the distributed database of the present invention, the present system proposes numerous advantages and features enabling mobility in a heterogeneous telecommunications network. It is thus believed that the operation and construction of the present invention will be apparent from the foregoing description. While the method, apparatus and system shown and described has been characterized as being preferred, it would be obvious that various changes and modifications can be made therein without departing from the spirit and scope of the invention as defined in the following claims.

What is claimed is:

1. A method for managing data used by application software having a plurality of application modules executable on switching and management systems located throughout a heterogeneous telecommunications network, comprising:

storing portions of the data used by said application software in data managers used for operational, accounting and maintenance, at a plurality of data storage locations within said operational, accounting and maintenance functions distributed within the telecommunications network in a separate module and which is independent of the application modules, each being supported by a data manager;

executing an application module to define the data used by said application software required during execution of said application software;

requesting the data manager supporting the application module to search the data managers at the data storage locations for the required data;

searching the data managers for the required data to identify the data manager in which the required data is stored; and retrieving the required data from the identified data manager and writing the retrieved data from the identified data manager to the application module for use during continued execution of said application software.

2. A method for managing data used by application software having a plurality of application modules executable on switching and management systems located throughout a heterogeneous telecommunications network, comprising:

storing portions of the data used by the application software in data managers at a plurality of data storage locations within operational, accounting and maintenance modules distributed within the telecommunications network and which are separate and independent of the application modules, each being supported by a data manager;

executing an application module to define the data used by the application software required to be updated during execution of said application software;

requesting the data manager supporting said application module to search the data managers at the data storage locations for the required data;

searching the data managers for the required data to identify the data manager in which the required data is stored; and updating the required data in the identified data manager and storing the updated data in the identified data manager for use during continued execution of said application software.

3. A method for managing data used by application software having a plurality of application modules executable on switching and management systems located throughout a heterogeneous telecommunications network, comprising:

storing portions of the data used by the application software in data managers at a plurality of data storage locations distributed within the telecommunications network separate from and independent of the application modules and within operational, accounting and maintenance modules, each being supported by a data manager;

executing an application module to define the data used by said application software required to be stored as backup during execution of the application software;

requesting said data manager supporting an application module to search said data managers at the data storage locations for the required data;

searching the data managers for the required data to identify the data manager in which the required data is stored; and backing up the required data in the identified data manager for use during continued execution of said application software.

4. A method as recited in claims 1, 2, or 3, wherein the step of searching further comprises the steps of:

first searching the supporting data manager and then any other data managers to identify the data manager in which the required data is stored.

5. A system for managing data used by application software having a plurality of application modules executable on switching and management systems located throughout a heterogeneous telecommunications network, comprising:

a plurality of data managers storing portions of the data used by said application software at a plurality of data storage locations distributed within the telecommunications network separate from and independent of the application modules and within operational, accounting and maintenance modules, each being supported by one data manager;

means for defining the data required during execution of said application software and requesting the data manager supporting the application module to search the data managers at the data storage locations for the required data used by the application software; and means responsive to the supporting data manager for searching the data managers for the required data to identify the data manager in which the required data used by the application software is stored for use during continued execution of said application software.

6. A system as recited in claim 5, wherein:

said means for searching comprises a high speed data link.

7. A system as recited in claim 5, further comprising:

means for retrieving the required data from an identified data manager and writing the retrieved data from the identified data manager to the application module for use during continued execution of said application software.

8. A system as recited in claim 7, wherein said means for retrieving comprises a high speed data link.

9. A system as recited in claim 5, further comprising:

means for updating the required data in the identified data manager and storing the updated data in the identified data manager for use during continued execution of said application software.

10. A system as recited in claim 5, further comprising:

means for backing up the required data in an identified data manager and storing the backed up data in the identified data manager for use during continued execution of said application software.

11. A data manager for supporting application modules in application software executable on switching systems located within a heterogeneous telecommunications network, comprising:

scheduler means responsive to a request from an application module regarding data in a database distributed independently of said application software throughout the telecommunications network for controlling communications between the application module and said data manager according to a defined protocol;

database management means responsive to said scheduler means for storing and retrieving data from a portion of the database located locally in said telecommunications network;

directory management means responsive to said scheduler means for identifying other data managers storing the remaining portion of the database distributed at other locations in the telecommunications network and within operational, accounting and maintenance modules; and communications means responsive to said scheduler means and directory management means for searching the other data managers for the data and retrieving the data therefrom for use during execution of said application software.

12. A system as recited in claim 11, wherein said communications means comprises:

a high speed data link for searching the other data managers and retrieving data therefrom.

13. A system as recited in claim 11, wherein said communications means comprises:

means for retrieving the data from other data managers and said scheduler means comprises means for writing the retrieved data from said communications means to the application module for use during continued execution of said application software.

14. A system as recited in claim 11, further comprising:

transaction means responsive to said scheduler means for updating the data in the other data managers via said communications means and storing the updated data in any selected one of said data managers.

15. A system as recited in claim 11, further comprising:

recovery means responsive to said scheduler means for backing up the data in the other data managers and storing the backed up data in any selected one of said data managers.

16. A heterogenous telecommunications network of switching systems, each system having hardware controlled by application software running on an operating system for providing and managing telecommunications services to subscribers independent of other such switching, maintenance and accounting systems, said switching system comprised of a plurality of independent switching modules, each of said switching systems comprising:

at least one application module for storing prior to execution said application software, said application software having control instructions and wherein data necessary for execution by said application software is stored in a separate operational, accounting or maintenance module and is independent of other application and data modules in said switching system, said application software operating said application modules by using stored data, wherein said application software is used for providing a set of services to a subscriber associated with said switching system; and at least one resource module for executing the control instructions provided by said application module and controlling hardware thereof to provide the set of services to a subscriber, said resource modules being connected to resources in other switching systems via high speed data links.

17. A heterogenous telecommunications network as set forth in claim 16 wherein said application module comprises:

means to access data stored in the hardware controlled by other resource modules within said heterogenous telecommunications network.

18. A heterogenous telecommunications network as set forth in 16 further comprising:

means to make accessible the set of services available to an associated subscriber from a first application module on a first switching to the same subscriber through a second application module on a second switching system when a subscriber is connected to said second switching system.

* * * * *